Sept. 23, 1947.   C. LYNN ET AL   2,427,731
DYNAMO-ELECTRIC MACHINE VENTILATION
Filed June 14, 1944
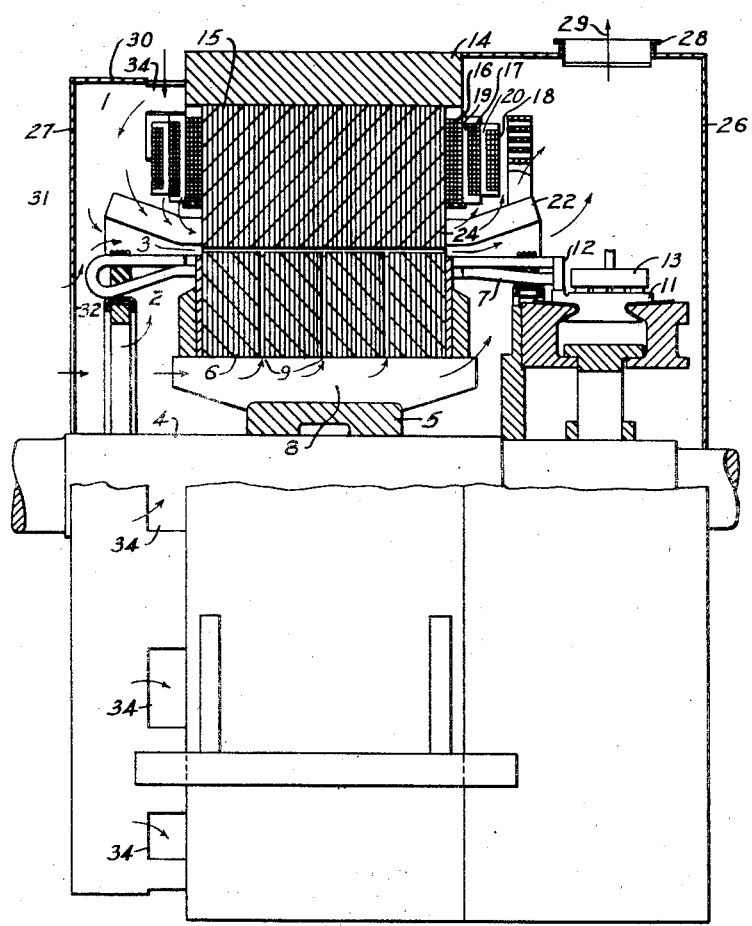
WITNESSES:
INVENTORS
Clarence Lynn and
Dillon B. Hoover.
BY
ATTORNEY Patented Sept. 23, 1947

2,427,731

UNITED STATES PATENT OFFICE 2,427,731

DYNAMOELECTRIC MACHINE VENTILATION

Clarence Lynn and Dillon B. Hoover, Pittsburgh, Pa., assignors to Westinghouse Electric Corporation, East Pittsburgh, Pa., a corporation of Pennsylvania Application June 14, 1944, Serial No. 540,324

3 Claims. (Cl. 171—252)

Our invention relates to improved means for properly distributing the air through a direct-current electrical generator, motor, or synchronous converter which is suction-ventilated from the front end, and which is provided with air-inlet means in the rear.

Heretofore, such machines have either been substantially open in the rear, or they have been provided with a rear end-bell which is provided with but a single round opening around the shaft. Experience has shown that such machines have a critical field-winding ventilating-problem, causing their output to be limited by permissible field-temperatures, and yet, if the rear end-bell is left off, or provided with so many openings in it that it is substantially open to the air at all points, the armature-member sometimes fails to get enough ventilation.

In accordance with our present invention, the rear end-bell of such a machine is provided with two sets of air-inlet openings, one of which mainly affects the armature-ventilation, while the other set of openings mainly affects the field-coil ventilation, so that the relative sizes of these two sets of air-inlet openings may be adjusted so that both the stator field-coils and the armature-windings are cooled to the best advantage. According to our invention, the rear end-bell is provided with a usual circular opening surrounding the shaft, for providing a direct air-inlet path for the armature-ventilation, and we also provide a series of arcuate slots in the peripheral portion of the rear end-bell, close to the field-magnet frame, for directly ventilating the main field-windings of the machine, said field-windings being preferably provided with radial ventilating-spaces between spaced concentric field-winding portions.

An exemplary form of embodiment of our invention is shown in the drawing, the single figure of which is a view, partly in side elevation, and partly in longitudinal vertical section, with parts broken away, showing the construction.

Our invention is shown applied to a direct-current dynamo-electric machine having a stator-member 1 and a rotor-member 2 having an air-gap 3 therebetween. The rotor-member is carried by a shaft 4 which carries an armature spider 5, supporting a laminated armature core 6, carrying armature windings 7. The armature spider 5 is provided with vent-means 8 for axially flowing ventilating-air, and the armature core 6 is preferably provided with radial ventilating-spaces 9. At one end, the rotor-member 2 is provided with a commutator 11 having armature-winding connections 12, and cooperating with brushes 13.

The stator-member 1 is provided with a magnet-frame 14 carrying a number of main pole-pieces 15 which are preferably laminated. Each main pole-piece is surrounded by an exciting winding, preferably in the form of a plurality of internested main field-coils 16, 17, and 18 which are separated by spacers 19 and 20 so as to provide radial ventilating-spaces.

The particular machine which is illustrated is also provided with a compensating winding 22 which is carried by the pole-face portions 24 of the several main poles 15. The machines may also be equipped with commutating poles (not shown) and having nothing to do with the applicability of our present invention. In general, whether commutating poles are utilized or not, and whether a compensating winding is utilized or not, the spaces between the various field-windings are fairly well filled, circumferentially of the machine, so that the ventilating path for axially moving air, moving across the field-windings of various kinds, is somewhat limited.

The field-frame is also provided with front and rear end-bells 26 and 27. The front end-bell 26 is over the commutator 11, and it has an air-outlet 28, and substantially no air-inlet. The air-outlet 28 may be a stack or chimney which provides natural draft-ventilation, or a suction-pump (not shown) may be provided for forcing a draft of air to flow out of the machine through the air-outlet 28, as indicated by the arrow 29.

The rear end-bell 27 is provided with a somewhat cylindrical or cup-shaped portion 30, the open end of which is attached to the magnet-frame 14, and it has a substantially radial end-plate 31 which is provided with a central air-inlet ventilating-opening 32, around the shaft 4.

In accordance with our invention, the air-inlet opening 32 is of such a size that the air which enters through said opening impinges directly upon the rear end of the armature-winding 7, and then for the most part passes axially through the armature spider, and into the air-gap 3 and the radial armature ventilating-spaces 9.

In accordance with our invention, we provide a second air-inlet means in the rear end-bell 27, said end-bell being substantially tightly closed except for these two air-inlet means. Said second air-inlet means is in the form of a plurality of arcuate slots 34 which are disposed along the inner portions of the cylindrical or cup-shaped portion 30 of the rear end-bell 27, said slots 34 being close to the magnet-frame 14, and close to the outer periphery of the rear ends of the field-windings 16, 17, and 18. The size of these peripheral air-inlet slots 34 is limited, and the slots are so positioned that the air which enters therein passes radially inwardly, directly over the field-windings, and radially inwardly through the rear portions of the radial ventilating-spaces 19 and 20 therein. This air then mingles with the air which enters through the shaft-encircling opening 32, and passes axially through the machine, partly between the stator field-windings, and partly through the air-gap 3, and possibly, in some cases, partly through the armature member of the rotor.

In accordance with our invention, it thus becomes possible, by the proper choice of the relative sizes of the two sets of air-inlet openings in the rear end-bell, to properly cool the stator fields and the armature to the best advantage. The size of the peripheral slots 34 has a strong effect upon the amount of cooling of the stator-fields, and it has only a relatively small effect upon the armature-temperature. On the other hand, the shaft-encircling air-inlet opening 32 takes care of the ventilation of the armature, and it has a relatively light effect upon the field-coil ventilation when the peripheral slots 34 are present.

We claim as our invention:

1. A dynamo-electric machine having a rotor-member having armature-windings and having a commutator at one end thereof, and a stator-member having field-windings, and a frame having front and rear end-bells, the front end-bell being over the commutator and having an air-outlet and substantially no air-inlet, the rear end-bell having an air-inlet opening surrounding the shaft, and having one or more air-inlet slots close to the field-windings, for causing a rear-end air-flow over the field-windings, and having substantially no other ventilating openings.

2. A direct-current dynamo-electric machine having a rotor-member having armature-windings and having a commutator at one end thereof, and a stator-member having a frame having main field-poles each having a plurality of spaced field coils having radially extending ventilating-spaces therebetween, said stator-member further having front and rear end-bells, the front end-bell being radially over the commutator and having an air-outlet and substantially no air-inlet, the rear end-bell having an air-inlet opening surrounding the shaft, and having a slotted portion over the rear sides of the field-coils, said slotted portion having one or more air-inlet slots close to the outer periphery of the field-windings, for causing a rear-end air-flow over the field-windings, said rear end-bell having substantially no other ventilating openings.

3. A dynamo-electric machine having a rotor-member having an armature having vent-means for axially flowing ventilating-air, said rotor-member further having a commutator at one end thereof, and a stator-member having field-windings, and a frame having front and rear end-bells, the front end-bell being over the commutator and having an air-outlet and substantially no air-inlet, the rear end-bell having an air-inlet opening surrounding the shaft, and having one or more air-inlet slots close to the outer periphery of the field-windings, for causing a rear-end air-flow over the field-windings, and having substantially no other ventilating openings.

CLARENCE LYNN.
DILLON B. HOOVER.

REFERENCES CITED

The following references are of record in the file of this patent:

UNITED STATES PATENTS

| Number | Name | Date |
|---|---|---|
| 923,673 | Lord | June 1, 1909 |
| 1,577,303 | Schurch | Mar. 16, 1926 |
| 1,684,168 | Bethel et al. | Sept. 11, 1928 |
| 1,778,036 | Noble et al. | Oct. 14, 1930 |
| 1,883,288 | Zubaty | Oct. 18, 1932 |

FOREIGN PATENTS

| Number | Country | Date |
|---|---|---|
| 321,393 | Great Britain | Nov. 4, 1929 |
| 372,328 | Germany | Mar. 26, 1923 |
| 58,614 | Sweden | Apr. 15, 1925 |